United States Patent
Owoc et al.

(10) Patent No.: US 7,168,220 B2
(45) Date of Patent: Jan. 30, 2007

(54) SINGLE PIECE POST CLADDING ELEMENT, METHOD OF CLADDING A POST AND METHOD OF FORMING A CLADDING ELEMENT

(75) Inventors: Anthony L. Owoc, North Wales, PA (US); Christopher Bourque, Chester Heights, PA (US); Alexander H. Plache, Strafford, PA (US); Stephen W. Steffes, McPherson, KS (US)

(73) Assignee: Certainteed Corporation, Valley Forge, PA (US)

(*) Notice: Subject to any disclaimer, the term of this patent is extended or adjusted under 35 U.S.C. 154(b) by 329 days.

(21) Appl. No.: 10/725,768

(22) Filed: Dec. 2, 2003

(65) Prior Publication Data

US 2005/0115191 A1 Jun. 2, 2005

(51) Int. Cl.
*E04C 3/30* (2006.01)
(52) U.S. Cl. .................... 52/736.3; 52/737.4; 52/738.1
(58) Field of Classification Search ............... 52/721.4, 52/723.1, 736.3, 737.4, 737.5, 738.1; 256/19, 256/1; D25/122, 124, 125, 126
See application file for complete search history.

(56) References Cited

U.S. PATENT DOCUMENTS

| | | | | |
|---|---|---|---|---|
| 4,019,301 A | * | 4/1977 | Fox | 52/721.4 |
| 4,516,756 A | * | 5/1985 | Beatty | 256/1 |
| 5,122,401 A | * | 6/1992 | Finkelstein | 428/36.5 |
| 5,899,044 A | * | 5/1999 | Jarrett | 52/737.4 |
| 5,899,239 A | * | 5/1999 | Coulis | 138/163 |
| 5,956,920 A | | 9/1999 | Davis | |
| 6,009,683 A | * | 1/2000 | Grewe et al. | 52/721.4 |
| 6,295,783 B1 | * | 10/2001 | Davis | 52/736.3 |
| 6,822,166 B2 | * | 11/2004 | James et al. | 174/93 |

OTHER PUBLICATIONS

L.B. Plastics, Inc., "Sheerline Column Clad" product literature, 2 pages.
Fukuvi USA, INC., "Vinyl Column System" product literature, 6 pages.
Plastival "PostWrap" product literature, 1 page.
Tek-Rail Inc. "Column Wrap" drawing dated Mar. 8, 2000, 1 page.
American Way Manufacturing product sheet entitled Vinyl Post Cladding & Trim, 1 page.
New Products from Tek-Rail, Tek-Board, Brick Mould and Post Wrap, 1 page.
Tek-Rail, Postwrap and Tek-Board pricing, 1 page.
International Search Report for PCT-US2004/039488, dated May 18, 2006.

* cited by examiner

*Primary Examiner*—Naoko Slack
*Assistant Examiner*—Jessica Laux
(74) *Attorney, Agent, or Firm*—Duane Morris LLP

(57) ABSTRACT

A post cladding element is provided including a one-piece elongated tubular flexible body having a continuous seam closure formed along the body and defined at first and second opposing longitudinal edges of the flexible body, whereby a post may be clad by flexing the body to open the seam closure a sufficient width to dispose the flexible body around the post.

23 Claims, 6 Drawing Sheets

SINGLE PIECE POST CLADDING ELEMENT, METHOD OF CLADDING A POST AND METHOD OF FORMING A CLADDING ELEMENT

FIELD OF THE INVENTION

The present invention relates to post cladding elements and assemblies, methods of cladding posts and methods of forming extruded cladding elements.

BACKGROUND OF THE INVENTION

Posts for supporting outdoor structures such as porches, decks, boat piers and fences are clad for several reasons, including protection from the elements, reducing maintenance (e.g., painting), providing an aesthetic appearance and matching a fence system.

There are two common cladding methods. In a first method, a cladding sleeve is slipped over the post prior to installation of the post or if there is an unobstructed post end. This first cladding method and element cannot be retrofitted onto a post that is already installed (hereinafter, "pre-installed post"). If by choice or due to physical constrains (i.e., a preinstalled post) the first cladding method is not used, then the post is clad using a multi-piece cladding assembly installed around the post. Two to four piece assemblies are most common. An example of such an assembly is provided in U.S. Pat. No. 5,956,920 to Davis, entitled "Modular Post Cladding Element, Post Cladding Assembly, and Method of Cladding a Post", issued Sep. 28, 1999. These multiple piece assemblies, however, require significant assemblage efforts and include several connection seams, each of which is subject to failure and provides an entry point for moisture.

Therefore, there remains a need for a new cladding element and method of cladding a post.

SUMMARY OF THE INVENTION

A post cladding element is provided including a one-piece elongated tubular flexible body having a continuous seam closure formed along the body and defined at first and second opposing longitudinal edges of the flexible body, whereby a post may be clad by flexing the body to open the seam closure a sufficient width to dispose the flexible body around the post.

A method of cladding a post is also provided. A one-piece elongated tubular flexible body is provided having a continuous seam closure formed along the body and defined at first and second opposing longitudinal edges of the flexible body. The body is flexed to open the seam closure a sufficient width to permit disposal of the body completely around the post.

The post cladding element and method of cladding a post provide several benefits. The cladding element is easily installed, providing consequent time and manpower savings. Further, the cladding element can be retrofitted onto pre-installed posts. Still further, the cladding element may be configured to hide fasteners or be utilized without fasteners, while also camouflaging or hiding the seam closure from view. The design is also easily scalable to fit any post size and length. Even further, the cladding element and method provide for improved protection of the post by reducing the number of seams when compared to multiple piece assemblies like Davis '920.

A method of forming a cladding element is also provided. An elongated tubular flexible body is extruded. The flexible body has a male connector and a female connector formed integrally therewith and connected to each other by an integral linking portion. The linking portion is cut to form a post cladding element having a continuous seam closure formed along the body and defined at first and second opposing longitudinal edges of the flexible body. The longitudinal edges include the male connector and the female connector, which are freed by the cutting step, whereby a post may be clad by flexing the body to open the seam closure a sufficient width to dispose the flexible body around the post and mating the male and female connectors. The forming method allows for the formation of a single piece cladding element including an integral male-female connection pair.

The above and other features of the present invention will be better understood from the following detailed description of the preferred embodiments of the invention that is provided in connection with the accompanying drawings.

BRIEF DESCRIPTION OF THE DRAWINGS

The accompanying drawings illustrate preferred embodiments of the invention, as well as other information pertinent to the disclosure, in which.

DETAILED DESCRIPTION

Figure 1A:
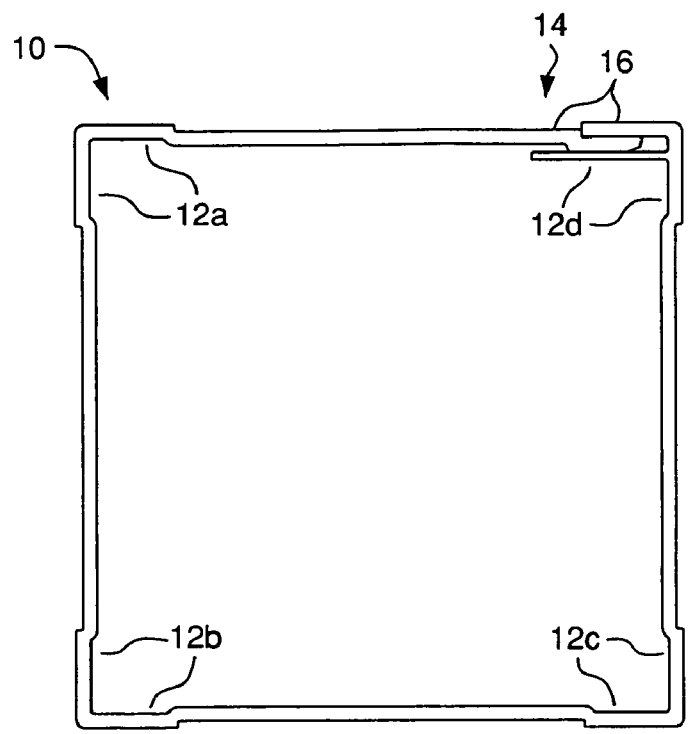
FIG. 1A is a top plan view of a one-piece post cladding element.
Figure 1B:
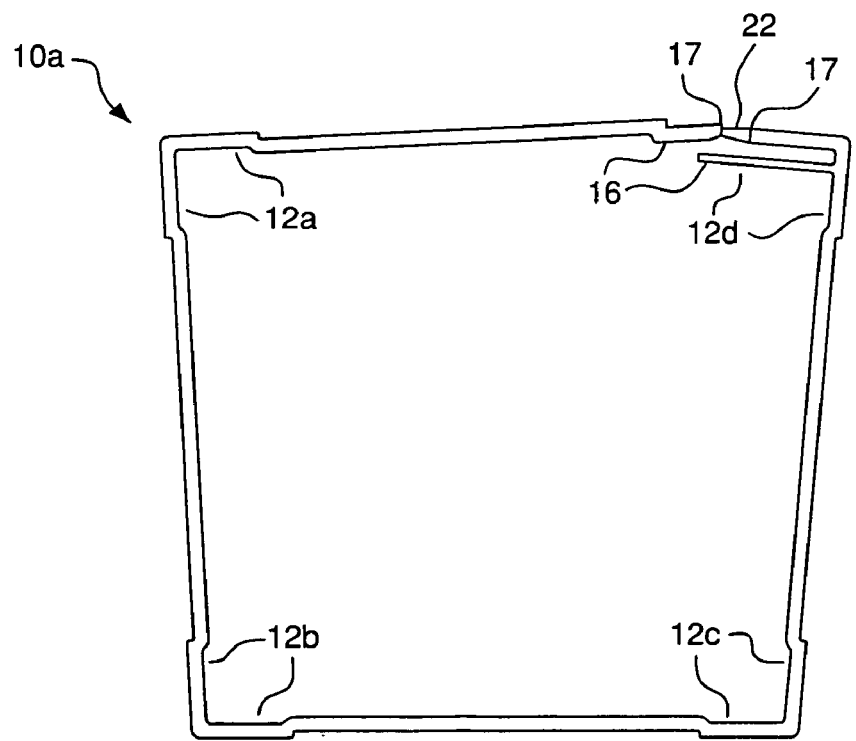
FIG. 1B is a top plan view of the cladding element as extruded.
Figure 1C:
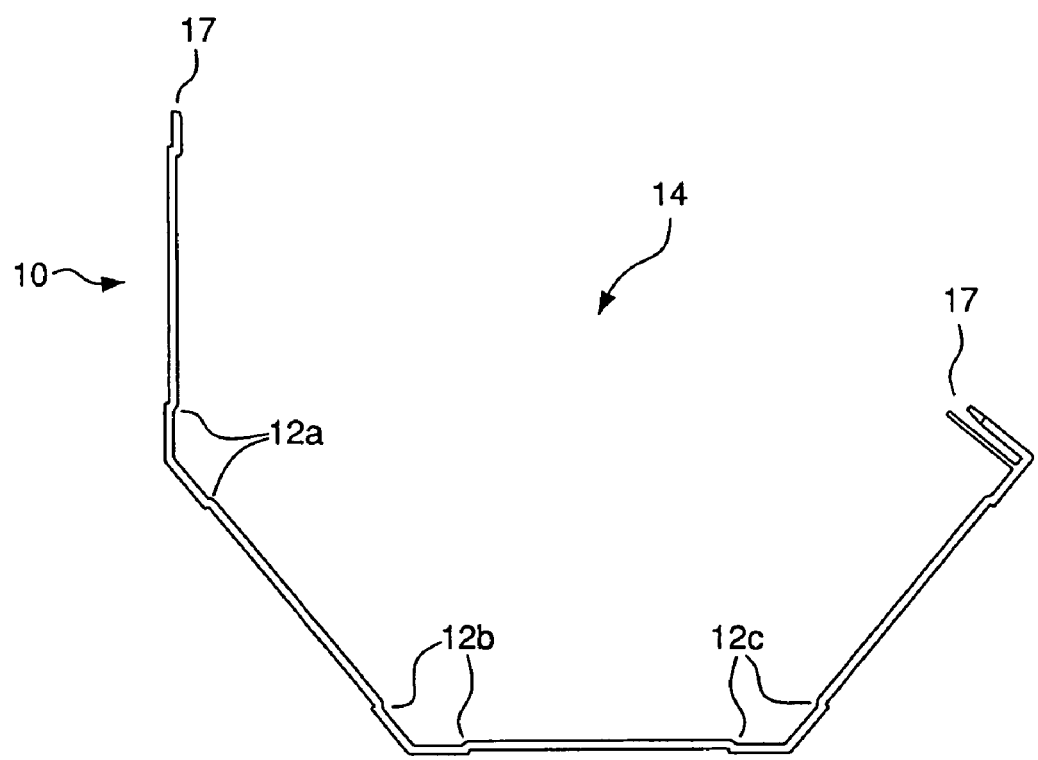
FIG. 1C is a top plan view of the cladding element of FIG. 1A shown flexed to open a seam closure therein.

A post cladding element and method of cladding a post are described hereafter in connection with FIGS. 1A–1C and 2. FIGS. 1A and 1C are top plan views of an exemplary embodiment of a post cladding element 10. The post cladding element 10 is an elongated tubular member having a flexible body shaped generally like a post that is to be clad. Although the element 10 is shown having a generally square profile, it should be understood that the cladding element can take on other shapes, such as rectangles, ovals, rounded shapes, hexagons, octagons or even irregular shapes. The cladding element can also be sized to fit any size post, e.g., 4", 6" or 8" posts.

Cladding element 10 comprises a thin profile one-piece extruded, or molded, for example, body. The profile preferably has a thickness of about 0.100"±10% and is formed from rigid PVC. The material selection and profile shape allow the body portion to flex at corners 12 to open a seam closure (indicated generally at 14) formed at opposing longitudinal edge regions 17 of the one-piece body. FIG. 1C shows the member 10 flexed to open seam closure 14. In an exemplary embodiment, each corner 12 is capable of flexing enough such that the seam closure 14 can open to a width sufficient to permit the cladding element to be disposed around a post 20, as shown in the perspective view of FIG. 2. Each corner is capable of flexing from its non-flexed, approximately 90° orientation (FIG. 1A) to at least between about 0–45°, as best shown in the top plan view of FIG. 1C. After the cladding element 10 is wrapped around the post 20, connectors 16 are mated. In one embodiment, where the cladding element 10 fits snugly around a post element, an opening formed by the seam closure 14 when the cladding element 10 is flexed is at least about the length of the smallest interior dimension of the post cladding element when the continuous seam closure is fully closed, i.e., in its secured, installed position around the post.

FIG. 1B is a top profile view of the member 10a as extruded and prior to use. Extruded element 10a includes a linking portion 22 formed during the extrusion process to allow for the formation of the male-female connectors 16. After the profile is extruded, a saw or knife cuts through the portion 22 to separate the connectors 16 and/or to remove the portion 22 to free connectors 16 and form seam closure 14. The saw or knife can be placed in the extrusion line, such as above the puller, to facilitate in-line cutting. In an alternative embodiment, the portion is not cut until the installation process, making the intermediate cladding element more rigid during transportation and storage. Portion 22 is removed, such as by cutting, bending or melting, for example, if it is not pre-sized to form a part of the male-female connector 16. If portion 22 is appropriately sized, the portion need only be cut to essentially form and separate the longitudinal edges 17 and free the connectors 16. The fabrication method allows for the formation of a single-piece cladding element including an integral male-female connection pair.

In one embodiment, corners 12a–12d of extrusion 10a have the following angles before portion 22 is cut or removed: 88.75°, 94°, 94° and 94°, respectively.

In an exemplary embodiment, the member 10 is formed in a coextrusion process, with the outer portions thereof being formed from weather resistant materials such as UV stabilized PVC, Acrylic or ASA (Acrylic-Styrene Acrylonitrite) and the inner portions being formed from cheaper, less durable materials such as mineral filled rigid PVC, prime powder or regrind.

Figure 2:
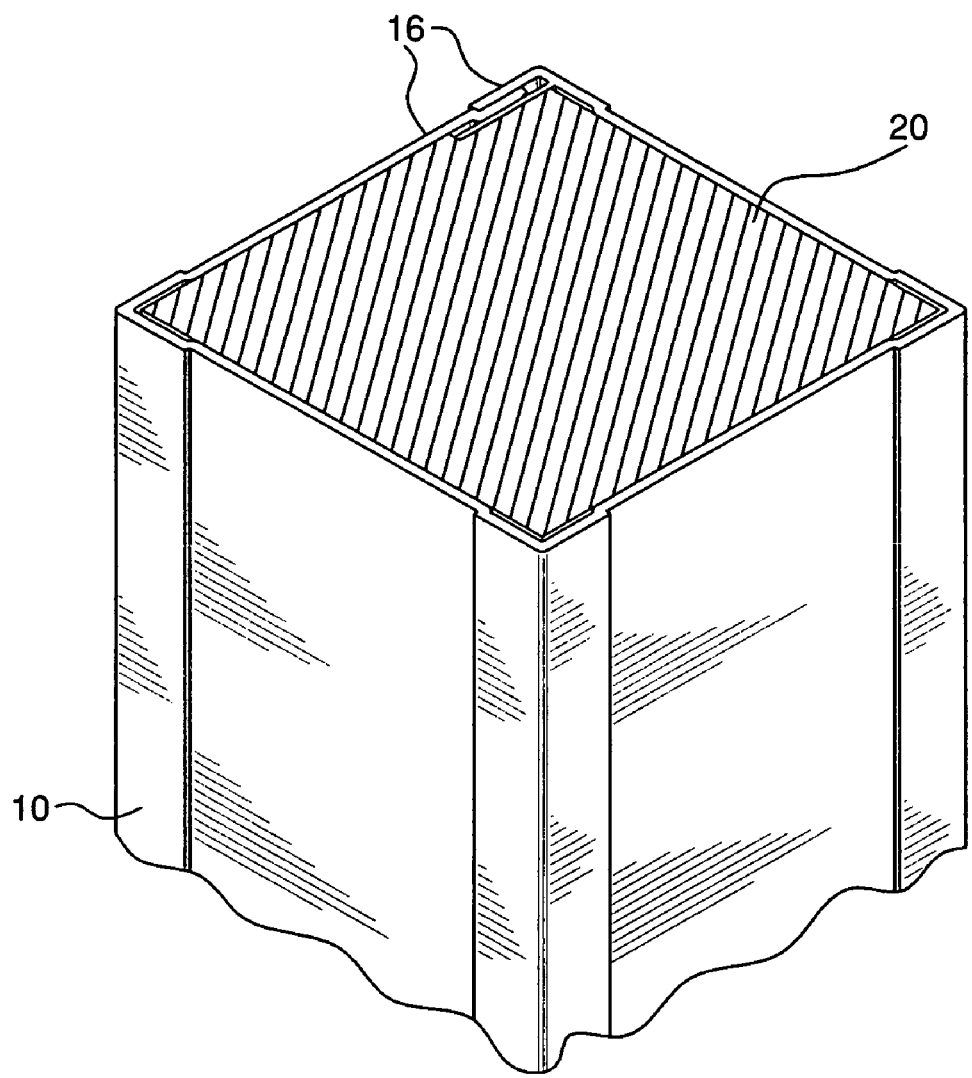
FIG. 2 is a partial perspective view of the cladding element of FIGS. 1A and 1C shown coupled to a post.
Figure 3A:
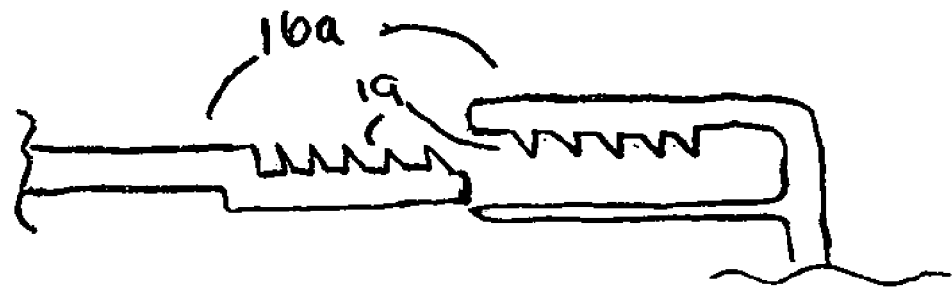
FIG. 3A is a partial view of an embodiment of male-female connectors including barbs.
Figure 3B:
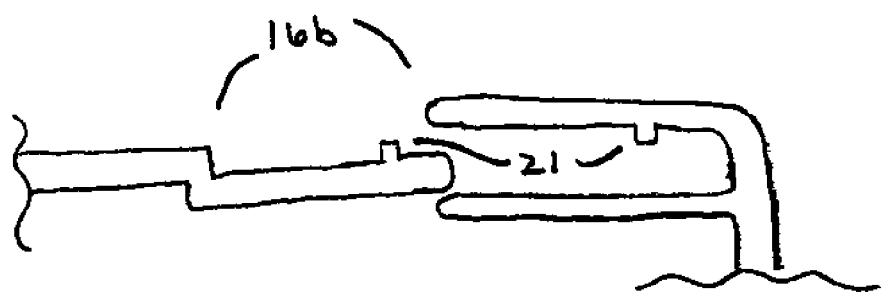
FIG. 3B is a partial view of an embodiment of male-female connectors including a latch.
Figure 5:
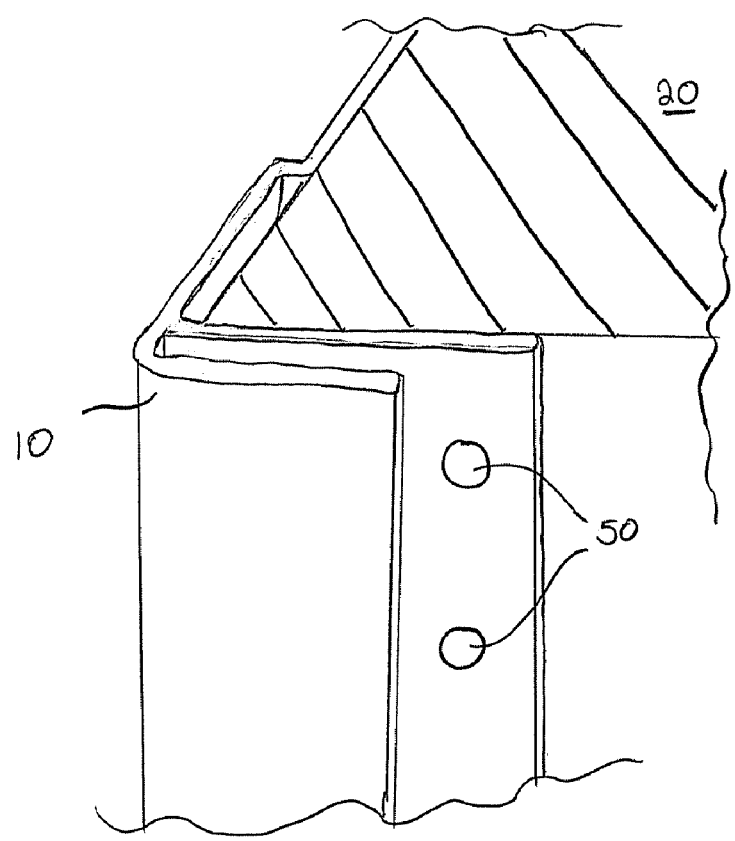
FIG. 5 is a partial perspective view showing a cladding element secured to a post.

As mentioned, FIG. 2 illustrates a cladding element 10 disposed around a post 20. The connectors 16 are mated to secure the element 10 and close seam closure 14. The seam closure is not visible on the outer surface of the cladding element 10 because it camouflaged into or is covered by the ornamental configuration of the outer surface. For additional support, fasteners such as screws or nails 50, as shown in FIG. 5, can be driven through the interior leg of the female connector into the post 20. These fasteners are then covered when the male connector is mated with the female connector. Male-female connection pair 16 may also be provided with latches (illustrated by latches 21 of male-female pair 16b of FIG. 3B) or barbs (illustrated by barbs 19 of male-female pair 16a of FIG. 3A) to further reinforce or secure the connection.

Figure 4:
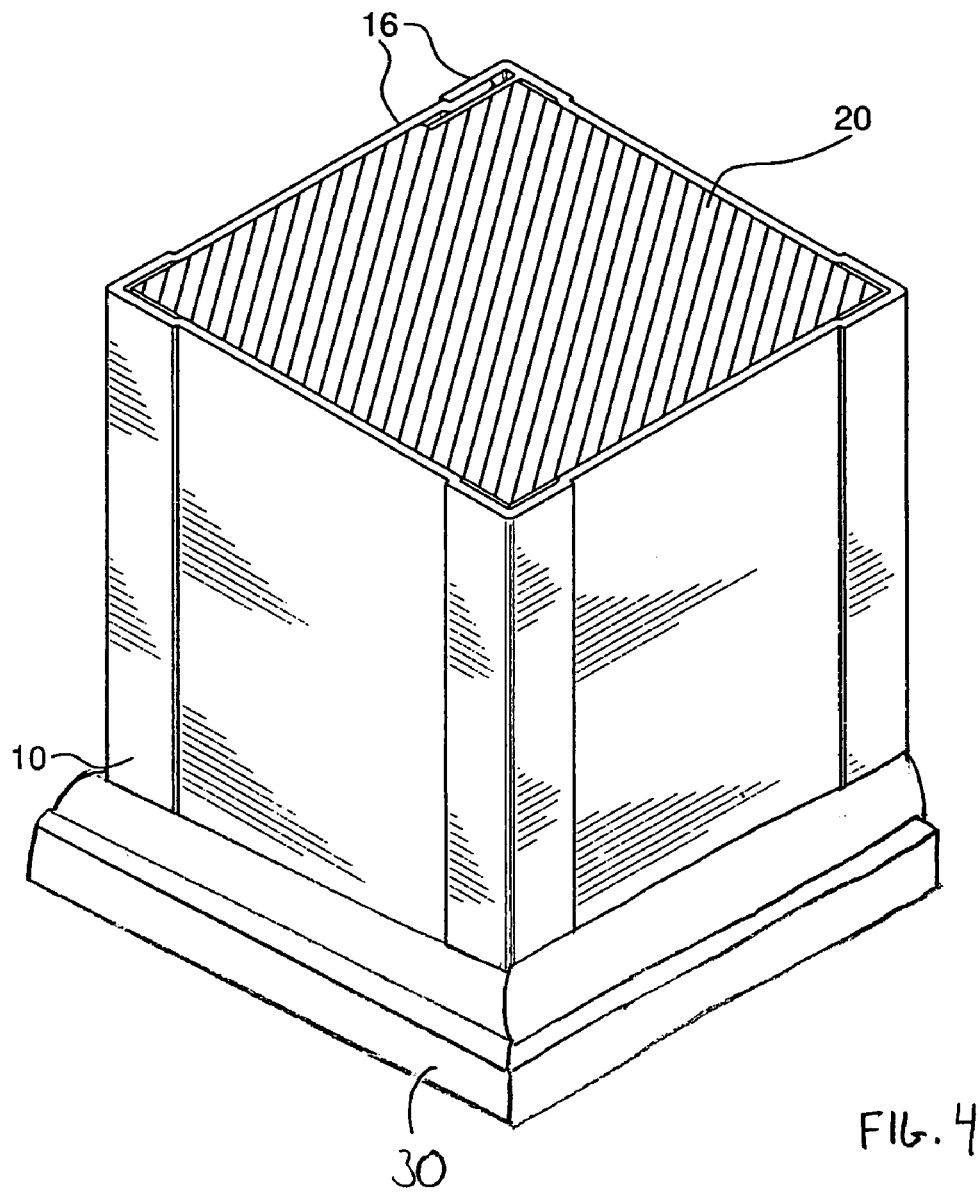
FIG. 4 is a partial perspective view of the cladding assembly of FIG. 2 having a decorative molding element attached thereto.

After the cladding element 10 is secured to the post 20, a decorative molding element, as described in, for example, Davis '920, may be secured proximate to the bottom and/or top portions of the cladding element to cover the end edges of the cladding element. An example of a decorative molding element 30 is shown in FIG. 4.

The post cladding element and method of post-cladding provide several benefits. The cladding element is easily installed, providing consequent time and manpower savings. Further, the cladding element can be retrofitted onto pre-installed posts. Still further, the cladding element may be configured to hide fasteners or be utilized without fasteners, while also hiding or blending the seam closure from view. The design is also easily scalable to fit any post size and length. Even further, the cladding element and method provide for improved protection of the post by reducing the number of seams when compared to multiple element assemblies.

In an alternative embodiment of the one-piece post cladding element and method of cladding a post, the cladding seam closure 14 may not open a sufficient width to slip the cladding element from the side of a post around the post. In this embodiment, the cladding element is flexed and slipped over the post from the top or bottom end of the post (as opposed to the side) prior to installation of the post or if there is an unobstructed post end, similar to the manner of the first installation method described in the Background of the Invention section, only the male-female connectors are then mated to firmly secure the cladding element to the post and to close the seam closure 14.

Although the invention has been described in terms of exemplary embodiments, it is not limited thereto. Rather, the appended claims should be construed broadly to include other variants and embodiments of the invention that may be made by those skilled in the art without departing from the scope and range of equivalents of the invention.

What is claimed is:

1. A post cladding element, comprising:
    a one-piece elongated tubular flexible body having first and second opposing longitudinal edges and a continuous seam closure formed along said body and defined at said first and second opposing longitudinal edges of said flexible body, whereby a post may be clad by flexing said body to open said seam closure a sufficient width to dispose said flexible body around said post,
    wherein said seam closure comprises a female connecter and a male connector disposed to mate with each other, whereby said opposing longitudinal edges are mated,
    wherein an outer surface of said flexible body includes an ornamental configuration, and
    wherein said male and female connectors cooperate to camouflage or hide said seam closure into said ornamental configuration.

2. The post cladding element of claim 1, wherein said male and female connectors include a retention latch or barb.

3. The post cladding element of claim 1, wherein said tubular flexible body comprises PVC.

4. The post cladding element of claim 1, wherein an opening formed with said width is at least about the length of the smallest interior dimension of said post cladding element when said continuous seam closure is fully closed.

5. The post cladding element of claim 1, wherein an opening formed with said width is less than the length of the smallest interior dimension of said post cladding element when said continuous seam closure is fully closed, whereby said flexible body is slipped over said post from a top or bottom end of said post.

6. A method of cladding a post, comprising the following steps:
    providing a one-piece elongated tubular flexible body having first and second opposing longitudinal edges and a continuous seam closure formed along said body and defined at said first and second opposing longitudinal edges of said flexible body; and flexing said body to open said seam closure a sufficient width to permit disposal of said body completely around said post,
wherein said seam closure includes a female connecter and a male connector disposed to mate with each other, said method further comprising the step of mating said female and male connectors after said flexing step to mate said opposing longitudinal edges,
wherein an outer surface of said flexible body includes an ornamental configuration, and
wherein said male and female connectors cooperate to camouflage or hide said seam closure into said ornamental configuration.

7. The method of claim 6, further comprising the step of disposing a plurality of fasteners through a portion of said female connector and into said post, wherein said male connector is disposed to cover said fasteners.

8. The method of claim 6, further comprising the step of applying a decorative molding proximate to a top or bottom portion of said body.

9. The method of claim 6, wherein said post is a pre-installed post.

10. The method of claim 6, wherein an opening formed during said flexing step with said width is at least about the length of the smallest interior dimension of said post cladding element when said continuous seam closure is fully closed.

11. The method of claim 6, wherein an opening formed during said flexing step with said width is less than the length of the smallest interior dimension of said post cladding element when said continuous seam closure is fully closed, wherein said flexible body is slipped over said post from a top or bottom end of said post.

12. A method of forming a cladding element comprising the steps of:
    extruding an elongated tubular flexible body, said flexible body having a male connector and a female connector formed integrally therewith and connected to each other by an integral linking portion;
    cutting said linking portion to form a post cladding element having first and second opposing longitudinal edges and a continuous seam closure formed longitudinally along said body and defined at said first and second opposing longitudinal edges of said flexible body, said longitudinal edges including said male connector and female connector, which are freed by said cutting step, and
    whereby a post may be clad by flexing said body to open said seam closure a sufficient width to dispose said flexible body around said post.

13. The method of claim 12,
    wherein an outer surface of said flexible body includes an ornamental configuration, and
    wherein said male and female connectors cooperate to camouflage or hide said seam closure into said ornamental configuration.

14. The method of claim 12, wherein said cutting step includes the step of removing said linking portion.

15. The method of claim 12, wherein said cutting step is in-line with an extrusion process including said extruding step.

16. The method of claim 12, wherein said cutting step is performed during installation of said cladding element.

17. A post cladding element comprising:
    an elongated tubular flexible body, said flexible body having a male connector and a female connector formed integrally therewith and connected to each other by an integral linking portion, wherein cutting said linking portion forms a post cladding element having first and second opposing longitudinal edges and a continuous seam closure formed longitudinally along said body and defined at said first and second opposing longitudinal edges of said flexible body, said longitudinal edges including said male connector and female connector, which are freed by cutting said linking portion, whereby a post may be clad by flexing said body to open said seam closure a sufficient width to dispose said flexible body around said post.

18. The post cladding element of claim 1, wherein said female connector comprises a U-shaped slot disposed at said first longitudinal edge and facing said second longitudinal edge to receive said male connector.

19. The method of claim 6, wherein said female connector comprises a U-shaped slot disposed at said first longitudinal edge and facing said second longitudinal edge to receive said male connector.

20. A cladded post assembly, comprising:
    a vertically oriented post member; and
    a post cladding element, said post cladding element comprising:
        a one-piece elongated tubular flexible body having first and second opposing longitudinal edges and a continuous seam closure formed along said body and defined at said first and second opposing longitudinal edges of said flexible body, said post cladding element disposed around said post member by flexing said body to open said seam closure a sufficient width to dispose said flexible body around said post member,
        wherein said seam closure comprises a female connecter and a male connector disposed to mate with each other, whereby said opposing longitudinal edges are mated,
        wherein an outer surface of said flexible body includes an ornamental configuration, and
        wherein said male and female connectors cooperate to camouflage or hide said seam closure into said ornamental configuration.

21. The cladded post assembly of claim 20, wherein said tubular flexible body comprises four corners when said opposing longitudinal edges are mated, wherein said ornamental configuration comprises raised sections at each corner.

22. The post-cladding element of claim 1, wherein said tubular flexible body comprises four corners when said opposing longitudinal edges are mated, wherein said ornamental configuration comprises raised sections at each corner.

23. The method of claim 6, wherein said tubular flexible body comprises four corners when said opposing longitudinal edges are mated, wherein said ornamental configuration comprises raised sections at each corner.

* * * * *